United States Patent [19]

Kudo et al.

[11] Patent Number: 4,557,936
[45] Date of Patent: Dec. 10, 1985

[54] SOYBEAN-BASED FIBROUS FOOD MATERIAL HAVING IMPROVED PRESERVABILITY AND TEXTURE

[75] Inventors: Shiro Kudo, Ito; Kunihisa Akaba, Iida, both of Japan

[73] Assignees: Asahi-matsu Foods Inc., Nagano; Takeda Chemical Industries, Ltd., Osaka, both of Japan

[21] Appl. No.: 435,394

[22] Filed: Oct. 19, 1982

[30] Foreign Application Priority Data

Oct. 30, 1981 [JP] Japan .............................. 56-173848

[51] Int. Cl.⁴ ........................... A23J 3/00; A23L 1/20
[52] U.S. Cl. ................................... 426/104; 426/331; 426/634; 426/656; 426/802
[58] Field of Search ............... 426/104, 634, 656, 442, 426/331, 802

[56] References Cited

U.S. PATENT DOCUMENTS 3,736,148  5/1973  Katz ................. 426/802 X
3,812,267  5/1974  Atkinson ......... 426/802 X
3,870,805  3/1975  Hayes et al. ..... 426/516 X
3,870,808  3/1975  Boyer et al. ..... 426/656 X
3,958,032  5/1976  Merriam .......... 426/802 X
3,966,977  6/1976  Levinson et al. ..... 426/331
4,125,630  11/1978  Orthoefer ....... 426/802 X
4,204,005  5/1980  Kudo et al. .
4,321,280  3/1982  Roy et al. ........ 426/656 X Primary Examiner—Robert Yoncoskie
Attorney, Agent, or Firm—Wenderoth, Lind & Ponack

[57] ABSTRACT

A soybean-based fibrous food material of improved preservability can be produced by incorporating polyhydric alcohol into a fibrous soybean material. The fibrous soybean material is prepared by grinding whole grains of soybean between two opposing disc grinding members. The food material can also be improved in texture by incorporating metal cations in a form of edible salt and/or an organic acid having 2 to 6 carbon atoms, with polyhydric alcohol into soybean material. The thus obtained soybean-based fibrous food material is useful as an ingredient of meat products, fish products and so on.

17 Claims, 1 Drawing Figure

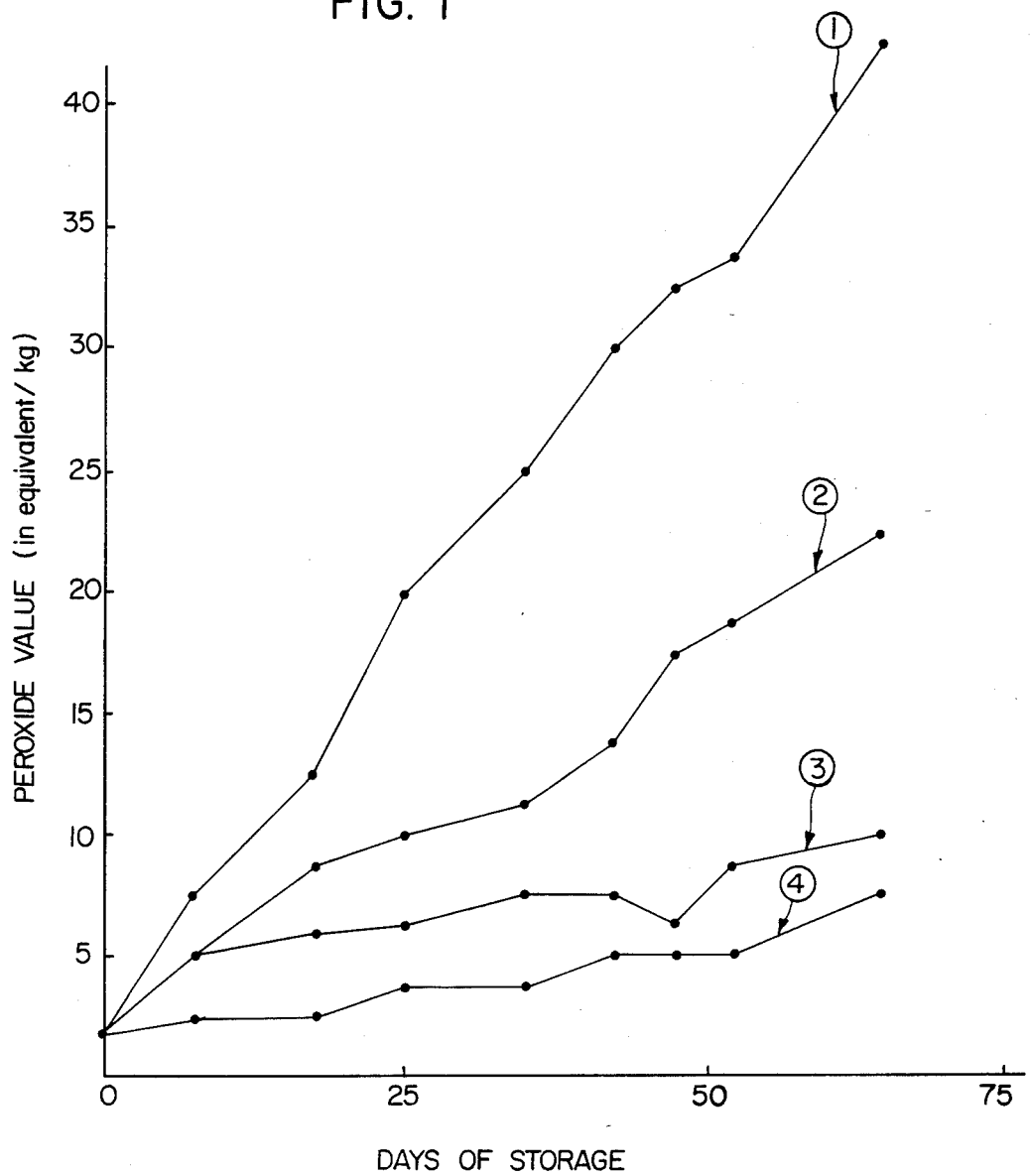

SOYBEAN-BASED FIBROUS FOOD MATERIAL HAVING IMPROVED PRESERVABILITY AND TEXTURE

The present invention relates to a soybean-based fibrous food material having improved preservability and/or texture, and a method for production thereof.

One of the present inventors, Shiro Kudo, and a coinventor developed a process for producing soybean-based food materials which are fibrous in appearance, have appropriate elasticity and meat-like texture, and are dried to produce dried food materials capable of being restored to their original form, retaining completely their form and shape and presenting their original elasticity and meat-like texture when treated with cold or hot water. The process has been patented as U.S. Pat. No. 4,204,005 (hereinafter referred as prior invention).

The process according to the prior invention is characterized by soaking for example whole grains of soybean as such in water to give them a suitable water content (water content of 30 to 60 weight percent), heat-treating the whole grains of soybean as such, whereby trypsin inhibitor and riboxygenase are deactivated to remove bad smell and unfavorable taste of the soybean, and a suitable extent of denaturation due to heating is simultaneously allowed to take place, then adjusting the water content after peeling is effected if necessary, and passing or grinding the whole grains of soybean as such through an extremely narrow gap (desirably in the region of 0.02 to 0.2 mm) between two grindstone plates of a colloid mill in rotation at a high speed.

More specifically in accordance with the prior invention, a soybean-based fibrous food material is produced by adjusting the water content of whole grains of soybean to between 10-65, preferably 20-65 weight percent and grinding said grains between two opposing disc grinding members separated by a gap not larger than 1 mm, wherein one of the grinding members rotates at a peripheral speed from 8 to 8000 m/min, and wherein the opposing discs are concave to form a central hollow portion therebetween having an approximately trapezoidal cross section.

The thus obtained soybean-based fibrous food materials retain their flexibility and their shapes well and are never destroyed by shock of any magnitude encountered during their conveyance, when they have a water content in the neighborhood of 20 weight percent. However, under such conditions, they exhibit an AW value (water activity) in the neighborhood of 0.9, and present difficulties in securing preservation at ordinary temperature for a prolonged period of time such as prevention of mold growth. Therefore, such fibers having a water content in the neighborhood of 20%, for storage and distribution, have to be refrigerated, which requires a high cost and brings about much inconveniences to users such as a long time required for thawing, etc. There is no solution to such problems other than a method which permits preservation at ordinary temperature for a prolonged period of time. Although this can be easily achieved by drying, such food material, which are fibrous-formed, get destroyed, broken to pieces or crumbled even by extremely slight shock, because of intense hardening.

On the other hand, the soybean-based fibrous food materials of the prior invention exhibit a decreased evaluation index of about 50 to 60 when treated with warm water at 75° C. and display a texture evaluation index lowered to the neighborhood of 30 when boiled, if the texture evaluation index when the material is treated with water at 20° C. is taken as 100. Therefore, said fibrous material is limited in a narrow scope when applied to food production.

Under the foregoing circumstances, the present inventors conducted extensive research to solve the problems as mentioned above, and as a result, have discovered that the method to be described below is unusually excellent for improving preservability and/or texture of the soybean-based fibrous food material.

Thus, an object of the present invention is to provide a soybean-based fibrous food material improved in preservability, which comprises, in admixture with the fibrous food material, about 1 to about 10 weight percent, on a dry basis, of polyhydric alcohol; and the water content of which is about 6 to about 15 weight percent.

Further object of the present invention is to provide a soybean-based fibrous food material improved in preservability and texture, which comprises, in admixture with soybean-based fibrous food material, (1) about 1 to about 10 weight percent, on a dry basis, of polyhydric alcohol;
(2) about 0.03 to about 0.6 gram equivalents of metal cations in a form of edible salt; and/or
(3) about 0.01 to about 2 gram equivalents of edible organic acid having 2 to 6 carbon atoms per kilogram of the fibrous food material on a dry basis; and the water content of which is about 6 to about 15 weight percent.

In the present invention, the fiberization processing treatment per se of soybean is carried out in accordance with the process as shown in the prior invention (U.S. Pat. No. 4,204,005), characterized in that said process comprises grinding with a colloid mill soybean with a water content of about 30 to about 60 weight percent to form fibrous material.

The soybeans to be employed according to the present invention may be whole grains of soybean and their processed matters having higher soy protein content as compared with the original soybean. As such processed matters, there may be mentioned defatted soybean, soy protein concentrate, soy protein isolate or the like.

Among those, whole grains of soybean and defatted soybean are more preferably used in this invention.

As the polyhydric alcohols to be employed according to this invention, there may be mentioned propylene glycol, glycerol, xylitol, sorbitol or reducing starch syrups having dextrose equivalents of about 10 to 50 etc., alone or in admixture of two or more kinds thereof.

The amount of polyhydric alcohol to be employed depends upon such factors as the kinds of polyhydric alcohol or water content of the finished food material, and in many cases it is preferable to employ 1 to 10 weight percent, more preferably 2 to 7 weight percent, on a dry basis, relative to the finished fibrous food material.

The polyhydric alcohol may be incorporated into soybean material before, during or after fiberization. For example, a powdery polyhydric alcohol is admixed with a fibrous material, the water content of the latter being adjusted in the neighborhood of 20 weight percent, or an aqueous polyhydric alcohol is sprayed on the fibrous material, or a fibrous material is soaked in an aqueous polyhydric alcohol of a suitable concentration, for example, 1 to 80 weight percent, at ordinary or elevated temperature.

It is more preferable that a required amount of polyhydric alcohol is admixed with soybean as a raw material in advance of fiberization and then the mixture is formed into fibers, because more flexible and uniform fibers can be obtained. In this case, when an amount exceeding 10 weight percent of polyhydric alcohol is admixed, fiberization is not accomplished well.

A fibrous food material incorporated with polyhydric alcohol by the method as mentioned above is dried to a water content of about 6 to about 15 weight percent. Drying may be in general carried out by drying under aeration at about 50° C. to 110° C., preferably 65° C. to 95° C.

When the fibrous food material is dried to a water content less than about 6 weight percent, the obtained fiber tends to lose flexibility and to get broken even by slight shock. In contrast, the soybean-based fibrous food material having a water content exceeding 15 weight percent cannot be preserved at ordinary temperature for a long period.

The soybean-based fibrous food material thus obtained is preservable at ordinary temperature for a prolonged period of time and retains an adequate degree of flexibility.

In the present invention, a soybean-based fibrous food material can be improved not only in preservability but also in texture by incorporating metal cations in a form of edible salt and/or edible organic acid having 2 to 6 carbon atoms, with a polyhydric alcohol, into soybean-based fibrous food material, and drying the so-treated soybean material to a water content of about 6 to about 15 weight percent.

Metal cations in a form of edible salt are incorporated into fibrous food material, in the range of about 0.03 to about 0.6 gram equivalents, preferably 0.1 to 0.4 gram equivalents, on a dry basis, relative to one kilogram of the fibrous food material, at any stage of the process.

As the metal cations, there may be employed di- or tri-valent metals to accelerate denaturation of soybean protein by heating in the form of edible salts. Such salts include calcium salts (e.g. calcium chloride, calcium sulfate, calcium carbonate, calcium citrate or calcium phosphate), magnesium salts (e.g. magnesium chloride, magnesium sulfate or magnesium carbonate), aluminium salts (e.g. aluminium chloride or alum), ferrous or ferric salts (e.g. ferrous chloride, ferrous sulfate, ferrous citrate, ferric chloride, ferric sulfate) and so on.

Among the above-mentioned salts, calcium chloride is the most effective and relatively cheap from the standpoint of costs. Calcium sulfate, calcium carbonate and calcium sulfate are of nearly equivalent effect, although they are less effective than calcium chloride at the same addition level. Alum can be expected to have an effect equal to calcium chloride, but when judged from the fact that calcium chloride is cheaper, calcium chloride is considered favorable.

While the amount of the edible metal salts to be thus employed depends upon the type of salts, it is undesirable to add an amount exceeding 0.6 gram equivalent, on a dry basis, per one kilogram of the fibrous food material because an undesirable taste is assumed.

The method and stage of incorporation of the edible metal salt are unlimited for practical purposes. The metal salt may be incorporated into soybean material before, during or after fiberization. In general, such a salt is dissolved or dispersed in water, for example, in a concentration of about 5 to 7 weight percent, and thus prepared solution or dispersion is premixed with soybean by using a mincer or a mixer, and then the mixture is subjected to fiberization processing treatment. Thus, the hardness of the soybean-based fibrous food material according to the present invention can be freely controlled by changing the type and amount of metal salts to be added.

In the present invention, a soybean-based fibrous food material having good texture can also be produced by incorporating about 0.01 to about 2 gram equivalents, preferably about 0.05 to about 1 gram equivalent, of edible organic acid having 2 to 6 carbon atoms on a dry basis, relative to one kilogram of the fibrous food material, into soybean-based fibrous food material.

The aforementioned organic acid may be any of the monocarboxylic acids, dicarboxylic acids, tricarboxylic acids, etc. The monocarboxylic acids include lower fatty acids, monocarboxylic acids having 1 to 5 hydroxyl groups, among others. The di- or tri-carboxylic acids may for instance be alkane-di- or tri-carboxylic acids (with 2 or 3 carboxyl groups attached to optional positions of an alkane chain.) Such alkane chains may be substituted in optional positions by hydroxyl and the number of such hydroxyl groups is 1 to 3.

The edible organic acid to be employed according to this invention involves lactones which change to acids by heating.

As examples of such organic acids, there may be mentioned acetic acid, fumaric acid, ascorbic acid, lactic acid, gluconic acid, glucuronic acid, malonic acid, succinic acid, citric acid, tartaric acid, malic acid, glutamic acid, folic acid, aspartic acid, glucono-δ-lactone, etc. In the case of a polybasic acid, there are cases in which at least one of its carboxyl groups is free, with the other carboxyl group or groups being in the form of an ester or salt. Among those water-soluble aliphatic carboxylic acids, acetic acid, citric acid, glucono-δ-lactone, etc. are particularly desirable for practical purposes.

Occasionally, an edible inorganic acid (e.g. hydrochloric acid, phosphoric acid, carbonic acid) can also be employed in the present invention.

The following methods are preferably carried out to incorporate the edible organic acid as mentioned above into soybean-based fibrous food material.

For instance, it may be preferable to subject the fibrous food material, produced by the prior invention, to treatment by soaking, blanching or spraying by means of an acid solution having a pH of not more than pH 5, preferably pH 4 to 5, or McIlvaine's buffer solution, etc. In case of citric acid, for example, it is most effective to subject the material to directly soaking in, blanching with, or spraying with a 2 to 5% solution.

After such treatment is conducted, excessive water is removed and drying is effected, if necessary. The soybean-based fibrous food material subjected to such treatment, when restored with water at 20° C., showed not less than 1.7 times higher hardness than the non-treated one. In addition, even when treated with hot water, its hardness does not decrease.

The point to be considered for this process is that soluble components get eluted during soaking; for example, in the case of soaking in a 2 weight percent citric acid solution for 10 min., there takes place a loss of about 20 weight percent or so of the total solid content. Since almost all soluble components are saccharides or sugars, such phenomenon is regarded as favorable, when saccharides or sugars are to be eliminated from such soybean-based fibrous food material. But, when taking into account a loss of raw materials, the procedure of soaking and blanching cannot always be said to be preferable.

As far as such point is concerned, the procedure of spraying with a minimum amount of the above organic acid solution is comparatively good, and is the most realistic and best one among the aforementioned procedures, although it suffers from a slight drawback of causing unevenness in spraying, etc. in the case of a large-scale treatment.

In case that acetic acid is employed, its incorporation is preferably carried out by allowing a soybean-based fibrous food material to stand in an atmosphere of volatilized acetic acid.

Thus, acetic acid is a highly volatile, strong acid, and while taking advantage of such volatility, acetic acid is placed in a tightly closed room, with the air in the room being circulated, if necessary, to create the atmosphere containing acetic acid; then, the soybean fibers produced previously (either before or after being dried) are allowed to stand therein for a certain period of time, whereby there can be produced higher hardness than in the case of soaking in the above organic acid solution. If necessary, the specimen having been treated with acetic acid is forcibly aerated for a little while to drive out the excess acetic acid and then pouched in bags. The thus obtained food material is free from odour of acetic acid and has an adequate hardness. In addition, this procedure offers the advantage that the fibers can be allowed to stand in the atmosphere of acetic acid for a further long period of time without any change, thus outstandingly facilitating the process control.

In case that lactones such as glucono-δ-lactone are employed, they can also be incorporated into soybean material before or during fiberization treatment, because they give no harmful effect on the formation of the fibers. Particularly, premixing of such lactones with soybeans as the raw material is preferable.

In the present invention, organic acids may be employed in combination with the edible metal salts as mentioned above.

The soybean-based fibrous food material obtained by the method as mentioned above has an improved preservability, while retaining good flexibility.

In addition, the soybean-based fibrous food material of the present invention has higher hardness than that obtained by the method of the prior invention (U.S. Pat. No. 4,204,005), and its hardness does not decrease even when treated with hot water. Therefore, the food material of this invention can be more advantageously used as an additive or as a raw material including any and all types of foods which involve heating during the routine production process or in the course of cooking.

Furthermore, the process of this invention produces a tender, bland fibrous food material which can be incorporated into meat or fish products to provide a pleasing taste and mouthfeel and to form a food product which is acceptable for human consumption.

Among these products are meat processed food such as corned beef, meat balls, hamburg steak, meat sauce or dried sausage; fish processed food such as fish sticks, mashed and seasoned fish, fish flakes or the like.

The following experiments and examples are further illustrative of this invention.

Experiment 1

Ten kilograms each of whole grains of soybean (water content 12%) were soaked in water until their water content reaches 43%, mixed well with various amounts of sorbitol, as indicated in Table 1, and then each of the mixtures was passed between two grindstone plates (clearance: 0.08 mm) revolving at a high speed (1,800 r.p.m) while being kept extremely closely spaced to thereby be crushed and converted into fibrous material.

The resultant fibrous material is dried at 80° C. under aeration until its water content is reduced as shown in Table 1.

These samples were subjected to the flexibility test and the preservation test as shown below.

Flexibility Test

Five kilograms of the fibers was packed in a pouch and pressed with a load of 50 Kg, and then vibrated for one hour. After stopping the vibration, the broken fibers were picked out and weighed. The degree of flexibility was shown by a weight percent of broken fibers relative to the tested one.

In this test when the weight of broken fibers was more than about 10%, the tested material was judged to be poor in flexibility and practical use.

Preservation Test

After each sample of the fibers was allowed to stand at 43° C. for 30 days, its peroxide value (P.O.V.) was measured by a conventional method. Samples having a P.O.V. exceeding about 35 m equivalents on a dry basis per kilogram, are not good in quality.

TABLE 1

| Water content (%) Added amount of sorbitol | | $4 \pm 0.3$ | $7 \pm 0.3$ | $11 \pm 0.3$ | $14 \pm 0.3$ | $18 \pm 0.3$ |
| --- | --- | --- | --- | --- | --- | --- |
| 0% | Broken Fiber (%) | 95 | 25 | 16 | 1 | 0 |
| | P.O.V. | 5 | 6 | 9 | 45 | 51 |
| 2% | Broken Fiber (%) | 92 | 19 | 1 | 0.5 | 0 |
| | P.O.V. | 3 | 3 | 4 | 22 | 39 |
| 5% | Broken Fiber (%) | 91 | 9 | 1 | 0 | 0 |
| | P.O.V. | 3 | 4 | 6 | 21 | 38 |
| 10% | Broken Fiber (%) | 39 | 8 | 1 | 0 | 0 |
| | P.O.V. | 3 | 4 | 5 | 22 | 41 |

As is clear from the above results, when sorbitol was incorporated into soybean-based fibrous material, the obtained fibers, excepting those whose water content was 4% and 18%, were improved in preservability and flexibility.

Furthermore, in case of the soybean-based fibrous materials having a water content of 18%, abundant growth of mold was observed when they were allowed to stand at 43° C. for 30 days.

Experiment 2

Five kilograms each of whole grains of soybean (water content 12%) were soaked in water until their water content reaches 53%, mixed well with the various amounts of the polyhydric alcohols indicated in Table 2, respectively and then each of the mixtures was passed between two grindstone plates (clearance: 0.1 mm) revolving at a high speed (2,000 r.p.m), while being kept extremely closely spaced to thereby be crushed and converted into fibrous material. Each of the result fibers was dried at 70° C. under aeration until its water content is reduced as shown in Table 2, respectively.

TABLE 2

|  | Polyhydric alcohol content (%) | Water content (%) | P.O.V. (40° C., 65 days) | Broken Fiber (%) |
|---|---|---|---|---|
| (1) No additive | — | 15 | 43 | 1 |
| (2) Sorbitol added | 4.5 | 11 | 23 | 1 |
| (3) Glycerol added | 4.6 | 9 | 10 | 4 |
| (4) Propylene glycol added | 6.5 | 7 | 7 | 3 |

Note: P.O.V. represents peroxide value (m equivalent per one kilogram). Broken Fiber (%) represents the same meaning as described in Experiment 1.

All these samples retained an adequate degree of flexibility and their shapes were almost undestroyed by the flexibility test. On the other hand, FIG. 1 illustrates P.O.V. of these samples in storage at 40° C. The FIGURE shows that the P.O.V. of the polyhydric alcohol-free control product remarkably increases as the period of storage is prolonged, whereas those of the polyhydric alcohol added products show small increments.

Thus, the soybean-based fibrous food material according to the present invention can be preserved for a prolonged period of time while keeping adequate flexibility.

EXAMPLE 1

Five kilograms of whole grains of soybean (water content 12%) were soaked in water to a water content of 50%, mixed well on the whole with 350 g of 70% sorbitol solution after removing excess water, and the mixture was allowed to pass between two grindstone plates revolving at 2000 r.p.m, while being kept extremely closely spaced (clearance: 0.1 mm) to thereby be crushed and converted into fibrous form. The thus obtained fibers were dried, at 70° C. under aerating, to a water content of 10 weight % to obtain about 5 kg of a product. The product retained adequate flexibility and also showed very stable preservability.

EXAMPLE 2

Whole grains of soybean in the amount of 5 kg were soaked in water to a water content of 50%, and formed into fibrous form by the same manner as in Example 1, after excess water was removed. The resultant fibrous material was soaked in a 27% glycerol solution for 30 minutes, and dried to a water content of 10 weight % after excess solution was removed by centrifugation. The product showed an AW value in the neighborhood of 0.63 and retained adequate flexibility.

EXAMPLE 3

Whole grains of soybean in the amount of 5 kg were soaked in water to a water content of 50%, digested with live steam of 100° C. for 30 to 60 seconds after excess water was removed, mixed well on the whole with 400 g of reducing starch syrup (Dextrose Equivalent: 40, concentration of 70%), subjected to a mincer fitted with a 3 mm dice, then formed into fibrous form by the same procedure as in Example 1, and dried to a water content of 10 weight %. The resultant product maintained the same shape as before drying, when strong impact was given.

EXAMPLE 4

To 5 kg of defatted soybean flour, 4 kg of aqueous solution containing 150 g of propylene glycol was added, thoroughly kneaded and heated for 5 minutes in an electronic range (microwave oven), until the water content reached 45%, and then formed into fibrous form by the same procedure as in Example 1, and dried at 85° C. under aerating to a water content of 15 weight %. The resultant fibers were able to be preserved at ordinary temperature for a prolonged of time, while keeping adequate flexibility.

EXAMPLE 5

Whole grains of soybean in the amount of 5 kg were soaked in water to a water content of 35%, digested with live steam of 100° C. for 30 seconds after excess water was removed, mixed well on the whole with 150 g of 70% sorbitol solution, then formed into fibrous form by the same procedure as in Example 1. The thus obtained product was soaked in 10 l of a 2% citric acid solution prepared in advance for 5 minutes. After excess water was removed, the formed material was dried at 90° C. under aerating until its water content was in the neighborhood of 7%.

The resultant fibrous material had adequate flexibility and also showed very stable preservability. The material was treated with water of 20° C. and hot water of 75° C. for 30 minutes, respectively, and excess water was removed. Their hardness was measured by Texturometer (Zenken Co. Ltd., Japan). The results are shown in Table 3.

TABLE 3

|  | at 20° C. | at 75° C. | (Unit: Texture unit) Rate of Change (75° C./20° C.) |
|---|---|---|---|
| Control | 8.1 | 4.5 | 0.55 (55%) |
| Sorbitol and citric acid added (citric acid content: 4.8%) | 12.0 | 11.9 | 0.99 (99%) |

Note: Control sample was produced by no addition of sorbitol and citric acid.

As is clear from the above results, the soybean-based fibrous food material of the present invention shows higher hardness than that of control sample, even when they were treated with hot water at 75° C.

EXAMPLE 6

Whole grains of soybean in the amount of 5 kg were soaked in water to a water content of 60%, mixed well on the whole with 480 g of reducing starch syrup (Dextrose Equivalent: 40, concentrations: 70%) containing 74 g of calcium chloride, then formed into fibrous form by the same procedure as in Example 1, and dried to a water content of 14% to obtain 5 kg of a product. The thus obtained fibrous food material had adequate flexibility and also showed very stable preservability.

Hardness values measured by the method of Example 5 are as shown in Table 4.

TABLE 4

|  | at 20° C. | at 75° C. | (unit: Texture unit) Rate of Change (75° C./20° C.) |
|---|---|---|---|
| Control | 8.2 | 4.3 | 0.52 (52%) |

TABLE 4-continued

| | at 20° C. | at 75° C. | (unit: Texture unit) Rate of Change (75° C./20° C.) |
|---|---|---|---|
| Reducing Starch syrup and calcium chloride added | 8.6 | 8.9 | 1.03 (103%) |

Note: Control sample was produced by no addition of reducing starch syrup and calcium chloride.

EXAMPLE 7

Whole grains of soybean in the amount of 5 kg were soaked in water to a water content of 50%, and formed into fibrous form by the same procedure as in Example 6. The thus obtained fiber was allowed to stand for 3 hours in a desiccator having its bottom filled with acetic acid and dried to obtain 5 kg of a product with a water content of about 13%.

The thus obtained fibrous food material had adequate flexibility and also showed very stable preservability.

Hardness values measured by the method of Example 5 are as shown in Table 5.

TABLE 5

| | at 20° C. | at 75° C. | unit: Texture unit Rate of Change (75° C./20° C.) |
|---|---|---|---|
| Control | 8.2 | 4.6 | 0.56 (56%) |
| Reducing starch syrup, Calcium chloride and acetic acid added (acetic acid content: 0.9%) | 12.1 | 12.0 | 0.99 (99%) |

Note: Control sample was produced by no addition of reducing starch syrup and acetic acid.

EXAMPLE 8

Defatted soybean flour in the amount of 10 kg was adjusted to a water content of 44%, mixed well on the whole with 2450 g of mixture consisting of 550 g of magnesium chloride hexahydrate, 900 g of sorbitol (concentration 70%) and 1000 g of water, and then introduced into a colloid mill (2,000 r.p.m., clearance: 0.02 mm) to obtain fibrous food material. The thus obtained fiber was allowed to stand for 8 hours in a vessel having its bottom filled with acetic acid and dried to a water content of 7% at 65° C. to 85° C. under aerating.

The soybean-based fibrous food material had adequate flexibility and also showed very stable preservability. In addition, its hardness did not decrease even when heated in boiling water for 30 minutes.

REFERENCE EXAMPLE 1

Five-hundred grams of ground beef, 400 g of butter-roasted hashed onion, 100 g of egg, 200 g of water, 100 g of rusk, 0.50 g of pepper, 0.50 g of nutmeg, 15 g of table salt and 500 g of a mixture consisting of 250 g of water and 250 g of the soybean-based fibrous food material obtained by Example 1 were mixed and molded into hamburger patties of 5 cm in diameter and 2 cm in thickness and cooked in a frying pan.

The hamburg steak samples thus prepared were compared with the control product prepared by using fibrous food material, which contains no sorbitol and no citric acid, by a sensory test. As a result of the test, the product containing the soybean-based fibrous food material of the present invention was superior to the control product in higher hardness and favorable texture.

What we claim is:

1. A fibrous food substance which comprises (1) a soybean-based fibrous food material produced by adjusting the water content of whole grains of soybean to between about 30 to about 60 weight percent and grinding said grains between two opposing disc grinding members separated by a gap not larger than 1 mm, wherein one of the grinding members rotates at a peripheral speed from 8 to 8000 m/min, and wherein the opposing discs are concave to form a central hollow portion therebetween having an approximately trapezoidal cross section, and having incorporated therein (2) about 1 to about 10 weight percent, based on said food substance, on a dry basis, of a polyhydric alcohol selected from the group consisting of propylene glycol, glycerol, sorbitol and reducing starch syrups; the water content of said food substance being about 6 to about 15 weight percent.

2. The food substance according to claim 1, wherein the polyhydric alcohol is sorbitol.

3. The food substance according to claim 1, wherein the polyhydric alcohol is glycerol.

4. The food substance according to claim 1, wherein the polyhydric alcohol is reducing starch syrups.

5. The food substance according to claim 1, wherein the fibrous food material is obtained from non-defatted soybeans.

6. A fibrous food substance which comprises (1) a soybean-based fibrous food material produced by adjusting the water content of whole grains of soybean to between about 30 to about 60 weight percent and grinding said grains between two opposing disc grinding members separated by a gap not larger than 1 mm, wherein one of the grinding members rotates at a peripheral speed from 8 to 8000 m/min, and wherein the opposing discs are concave to form a central hollow portion therebetween having an approximately trapezoidal cross section, and having incorporated therein (2) about 1 to about 10 weight percent, based on said food substance, on a dry basis, of a polyhydric alcohol selected from the group consisting of propylene glycol, glycerol, sorbitol and reducing starch syrups, (3) about 0.03 to about 0.6 gram equivalent of an edible calcium or magnesium salt, and/or (4) about 0.01 to about 2 gram equivalents of an edible organic acid selected from the group consisting of acetic acid, citric acid and lactic acid, the amounts of said salt and acid being per kilogram of said fibrous food material on a dry basis; the water content of said food substance being about 6 to about 15 weight percent.

7. The food substance according to claim 6, wherein the edible salt is a calcium salt.

8. The food substance according to claim 7, wherein the calcium salt is calcium chloride.

9. The food substance according to claim 7, wherein the calcium salt is calcium sulfate.

10. The food substance according to claim 6, wherein the organic acid is citric acid.

11. The food substance according to claim 6, wherein the organic acid is acetic acid.

12. The food substance according to claim 6, wherein the polyhydric alcohol is sorbitol.

13. The food substance according to claim 6, wherein the polyhydric alcohol is glycerol.

14. The food substance according to claim 6, wherein the polyhydric alcohol is reducing starch syrups.

15. The food substance according to claim 6, wherein the fibrous food material is obtained from non-defatted soybeans.

16. A method for producing a fibrous food substance which comprises:
    (1) adjusting the water content of whole grains of soybean to between about 30 to about 60 weight percent and grinding said grains between two opposing disc grinding members separated by a gap not larger than 1 mm, wherein one of the grinding members rotates at a peripheral speed from 8 to 8000 m/min, and wherein the opposing discs are concave to form a central hollow portion therebetween having an approximately trapezoidal cross section;
    (2) incorporating about 1 to about 10 weight percent, based on said food substance, on a dry basis, of a polyhydric alcohol selected from the group consisting of propylene glycol, glycerol, sorbitol and reducing starch syrups into the ground soybean material by adding said polyhydric alcohol to the soybean material before or after said grinding; and
    (3) drying the so-treated soybean material to a water content of about 6 to about 15 weight percent.

17. A method for producing a fibrous food substance which comprises:
    (1) adjusting the water content of whole grains of soybean to between about 30 to about 60 weight percent and grinding said grains between two opposing disc grinding members separated by a gap not larger than 1 mm, wherein one of the grinding members rotates at a peripheral speed from 8 to 8000 m/min, and wherein the opposing discs are concave to form a central hollow portion therebetween having an approximately trapezoidal cross section;
    (2) incorporating about 1 to about 10 weight percent, based on said food substance, on a dry basis, of a polyhydric alcohol selected from the group consisting of propylene glycol, glycerol, sorbitol and reducing starch syrups into the ground soybean material by adding said polyhydric alcohol to the soybean material before or after said grinding;
    (3) incorporating about 0.03 to about 0.6 gram equivalent of an edible calcium or magnesium salt into the ground soybean material by adding said salt to the soybean material before or after said grinding; and/or
    (4) incorporating about 0.01 to about 2 gram equivalents of an edible organic acid selected from the group consisting of acetic acid, citric acid and lactic acid into the ground soybean material after the grinding, the amounts of said salt and acid being per kilogram of said ground soybean material on a dry basis; and
    (5) drying the so-treated soybean material to a water content of about 6 to about 15 weight percent.

* * * * *